(12) United States Patent
McConnell (10) Patent No.: US 6,701,238 B2
(45) Date of Patent: Mar. 2, 2004

(54) VEHICLE IMPACT DETECTION SYSTEM AND CONTROL METHOD

(75) Inventor: Douglas A. McConnell, Rochester Hills, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 10/184,462

(22) Filed: Jun. 28, 2002

(65) Prior Publication Data

US 2003/0023360 A1 Jan. 30, 2003

Related U.S. Application Data

(60) Provisional application No. 60/307,480, filed on Jul. 24, 2001.

(51) Int. Cl.[7] .................................................. G06F 7/00
(52) U.S. Cl. ............................ 701/45; 701/46; 701/47
(58) Field of Search ........................... 701/45, 46, 47; 200/728.1, 734, 735; 340/425.5, 429, 435, 436; 307/9.1, 10.1

(56) References Cited

U.S. PATENT DOCUMENTS 5,293,153 A * 3/1994 Rochette et al. ............ 340/438

FOREIGN PATENT DOCUMENTS

| EP | 0 785 112 A1 | 7/1997 |
| EP | 0 982 199 A1 | 3/2000 |
| EP | 0 987 151 A1 | 3/2000 |
| EP | 1 026 052 A2 | 8/2000 |

* cited by examiner

*Primary Examiner*—Yonel Beaulieu

(57) ABSTRACT

A strategy for determining the type of impact condition experienced by a vehicle (24) and for deciding whether to deploy a supplemental restraint device such as an airbag (22) includes using a difference between a front sensor (32) velocity and a tunnel sensor (34) velocity. Determining whether the difference between the front sensor velocity and the tunnel sensor velocity exceeds a difference threshold provides information regarding an impact condition that allows a controller to operate at a lower bandwidth and in a more reliable fashion. By combining the determination whether the difference threshold has been exceeded with at least one other parameter, at least three discreet types of impact conditions can be discriminated and a decision can be made whether to deploy a supplemental restraint device.

23 Claims, 7 Drawing Sheets

VEHICLE IMPACT DETECTION SYSTEM AND CONTROL METHOD

CROSS REFERENCE TO RELATED APPLICATIONS

This application claims priority to U.S. Provisional Application No. 60/307,480, which was filed on Jul. 24, 2001.

BACKGROUND OF THE INVENTION

This invention generally relates to vehicle impact detection. More particularly, this invention relates to a system and method for utilizing information gathered from sensors on a vehicle to determine the type of impact and a desired resulting control.

Various devices have been incorporated into vehicles to prevent or minimize injury during impact or collisions. Supplemental restraint devices, including airbags for example, require control arrangements for processing information about impact events and appropriately controlling the supplemental restraint devices.

A recent trend has been to incorporate more electronically controlled peripheral devices on a vehicle and to control such devices using a single electronic controller. This presents several challenges and difficulties. For example, a given microprocessor may not have the bandwidth necessary to accomplish all of the processing and calculation necessary to achieve desired control of the various peripheral devices. To avoid utilizing more complex or expensive processors, alternative strategies and algorithms are required to achieve the desired overall performance.

This invention provides an improved approach to processing information from impact detection sensors that allows a controller to more easily determine the nature of impact and then accordingly control a supplemental restraint device such as an airbag.

SUMMARY OF THE INVENTION

In general terms, this invention is an impact detection system for use on a vehicle.

In one example use of this invention, at least one front sensor is positioned near a front portion of the vehicle. At least one tunnel sensor is positioned near a central location on the vehicle. A controller communicates with each of the front sensor and the tunnel sensor and determines an impact condition based upon determining whether a difference between a front sensor velocity and a tunnel sensor velocity exceeds a difference threshold.

The inventive system uses various pieces of information gathered or derived from the front sensor and tunnel sensor in addition to the determined difference between the front sensor velocity and the tunnel sensor velocity to determine the type of impact condition and to responsively provide control for a supplemental restraint device such as an airbag.

A method of controlling the operation of a supplemental restraint device according to this invention includes determining a front sensor velocity and a tunnel sensor velocity. A difference between the sensor velocities is compared to a difference threshold to determine when an impact condition has occurred that may warrant activating a supplemental restraint device.

According to this invention, different variables can be used in several combinations to address at least three distinct impact conditions to enable the desired control of the airbag or other supplemental restraint device.

The various applications of a control strategy designed according to this invention along with the various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
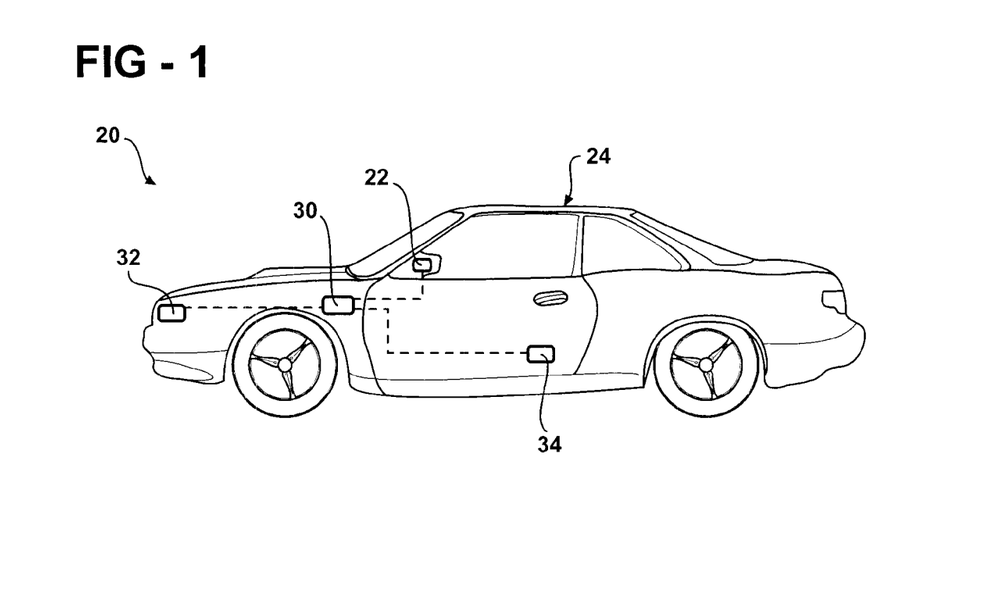
FIG. 1 schematically illustrates a vehicle including a system designed according to this invention.
Figure 2:
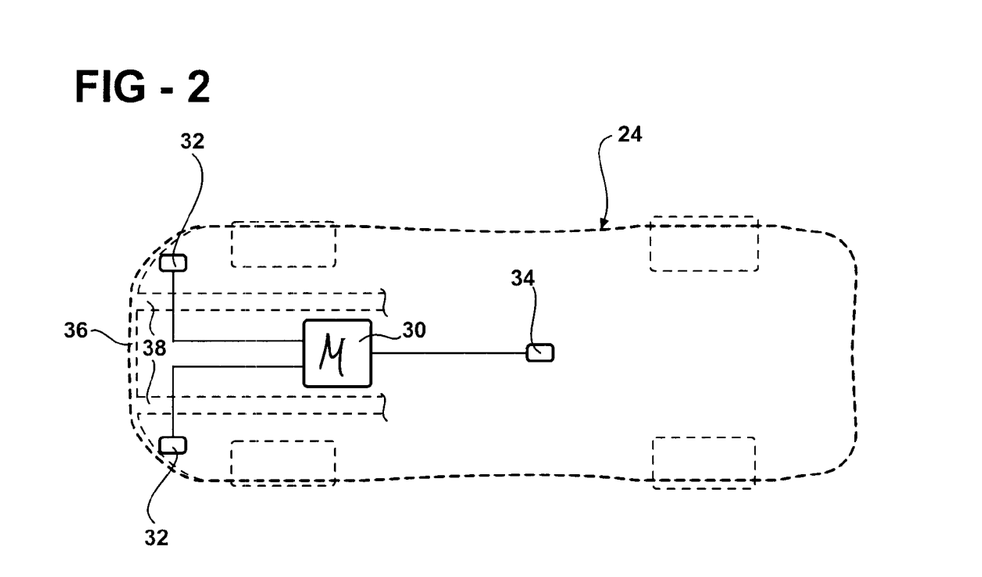
FIG. 2 is a schematic illustration of selected portions of the system on the vehicle of FIG. 1.

FIGS. 1 and 2 schematically show a system 20 for detecting impact conditions and controlling a supplemental restraint device such as an airbag 22 on a vehicle 24. The system 20 includes a controller 30 that communicates with sensors located on the vehicle that provide the controller 30 with information regarding an impact event such as a collision with a barrier or another vehicle.

The illustrated example includes two front sensors 32 and a tunnel sensor 34. The illustrated example includes right and left front sensors 32 supported on the vehicle 24 in selected positions relative to a front bumper 36 and frame rails 38. Although two front sensors 32 are illustrated, it is possible to utilize a single front sensor or more front sensors in a system designed according to this invention.

The front sensors 32 and the tunnel sensor 34 are conventional components that provide acceleration information that is indicative of the vehicle 24 experiencing an impact event. Known techniques allow processing signals from the sensors to determine acceleration, velocity and slope information.

The inventive system 20 provides a unique strategy and method for gathering information from the sensors 32 and 34 and determining the type of impact event for allowing the controller 30 to control a supplemental restraint device such as the airbag 22 responsive to the detected event.

The controller 30 preferably is programmed to determine various data or information based upon signals received from the sensors 32 and 34. The controller 30 is suitably programmed to determine a difference between the front sensor velocity and the center tunnel sensor velocity. In one example, a damped velocity from the sensor is used. The difference between the sensor velocities provides one indicator that is useful within a system designed according to this invention for making a determination of the type of impact event and the type of response necessary. The controller 30 determines this information based upon signals from the sensors. Those skilled in the art who have the benefit of this description will be able to appropriately program a commercially available microprocessor to function as the controller 30.

The difference between the sensor velocities is compared to a difference threshold. The difference threshold for the various impact events varies based upon the physics of the event. The threshold is at least partially calculated from acceleration information gathered from the sensors. Those skilled in the art can use known techniques to arrive at an appropriate threshold. Those skilled in the art who have the benefit of this description will be able to arrive at appropriate thresholds for the various determinations needed to achieve the results provided by this invention to meet their particular needs.

Another parameter determined by the controller 30 is a slope valve that is related to the acceleration of a sensor. Calculating the slope valve is accomplished in a known manner to provide information regarding a relationship between faster acceleration and slower acceleration as experienced by the sensors.

Because the relationship between the front sensor velocity and the tunnel sensor velocity provides a good indication of front end intrusion in an impact event, that determination preferably is a primary feature of a system designed according to this invention. The slope determination used in conjunction with the difference between the front sensor velocity and the tunnel sensor velocity provides the capability of discriminating across the spectrum of frontal events.

One advantage of this invention is that it provides the ability to discriminate between at least three distinct types of impacts. The example types of impacts used for purposes of discussion are a frontal impact, a bumper override impact and an offset impact (i.e., a forward but not head-on impact). As will be described below, the difference between the front sensor velocity and the tunnel sensor velocity is combined with other selected data in various manners to discriminate between the types of impact events. That information is also used to determine whether to activate or deploy a supplemental restraint device such as an airbag. Moreover, this invention allows for making such a determination in about one-half the run time compared to previous determination algorithms. Accordingly, this invention provides additional features, reduced running time and better control.

Example implementations of one system designed according to this invention are described below including three strategies for discriminating between three different types of frontal impact events. Each one of the example strategies may be tailored for various airbag deployment thresholds. In the examples described below, the algorithm was processed at 2 kilohertz to reduce the risk of latency, particularly between signal sources. The example tunnel accelerometer 34 was a +/−70 g device having an analog to digital range of 7 bits (128 counts). The example front sensor 32 is a +/−250 g device.

A frontal impact detection is based on the front sensor velocity minus tunnel sensor velocity valve exceeding a tunnel sensor-based difference threshold. In systems having right and left front sensors 32, the difference between each front sensor velocity and the tunnel sensor velocity must exceed the difference threshold within a selected time of each other (i.e., within a selected window).

Determining when there is a frontal impact event in this example includes determining the difference between the front sensor velocity and the tunnel sensor velocity and when that difference exceeds a difference threshold. Another determination associated with deciding that the impact event is a frontal impact is determining the slope of the acceleration of the tunnel sensor. The time at which a slope threshold is exceeded is compared to a time at which the difference threshold was exceeded. If the two thresholds were exceeded within a selected time window and if a tunnel velocity threshold was met combined with the tunnel average acceleration exceeding a threshold when the other criteria are met then the resulting determination is that there is a frontal impact event and that the supplemental restraint device should be activated or deployed.

Figure 3:
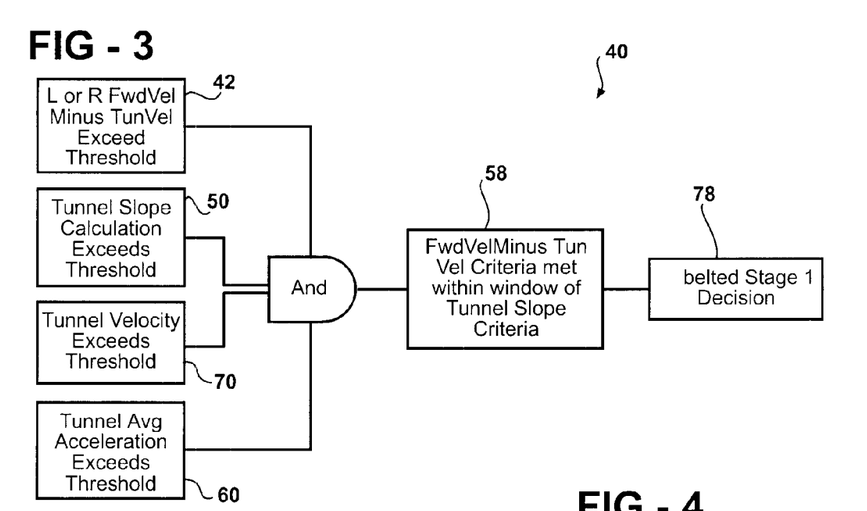
FIG. 3 is a logic flow diagram of a decision strategy useful in a first example impact condition.
Figure 4:
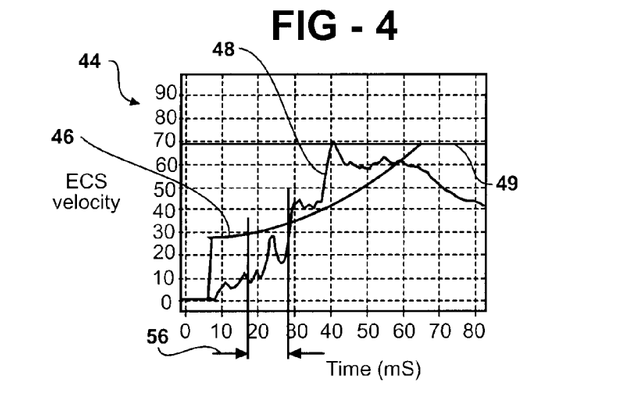
FIG. 4 is a graphical illustration of sensor information as used in one example implementation of this invention.

Referring to FIGS. 3–7, a frontal impact event is detected and the decision whether to deploy the airbag 22 is determined according to the logical flow diagram 40. The difference between the front sensor velocity and the tunnel sensor velocity is determined at 42. FIG. 4 includes a graphical illustration 44 of a threshold 46 compared to a plot 48 of the value of the front sensor velocity minus the tunnel sensor velocity. As can be appreciated from the illustration, at a time of 29 milliseconds the value of the difference 48 between the front sensor velocity and the tunnel sensor velocity exceeds the displacement threshold 46. At approximately 40 milliseconds, that difference 48 exceeded a severe threshold 49 in the illustrated example.

Figure 5:
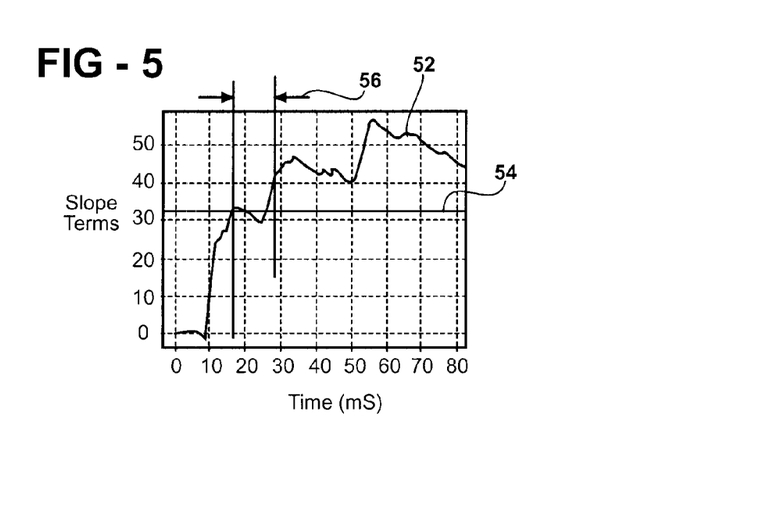
FIG. 5 is a graphical illustration of sensor information as used in one example implementation of this invention.

The tunnel sensor slope valve is compared to a threshold at 50. As shown in FIG. 5, the plot 52 exceeds the threshold 54 at a time of approximately 17 milliseconds in the illustrated example. The 12 second difference in time between the time when the slope 52 exceeds the threshold 54 and the time when the difference 48 between the front sensor velocity and the tunnel sensor velocity exceeds the difference threshold 46 is shown in the window 56 in FIGS. 4 and 5. The determination of whether to deploy an airbag depends in part on whether the window 56 is within a selected window size. In the illustrated example, the window 56 is within the selected window size. This determination is schematically illustrated at 58 in FIG. 3.

An optional portion of the example determination of a frontal impact event includes determining whether a tunnel sensor average acceleration valve exceeds a threshold at 60. As can be appreciated in FIG. 6, several thresholds may be used in connection with this portion of the determination. A tunnel sensor average acceleration minimum threshold is shown at 62. A tunnel sensor average acceleration distance threshold is shown at 64. A tunnel sensor average acceleration severe threshold is shown at 66. Those skilled in the art who have the benefit of this description will realize how to determine or select the appropriate thresholds for a given vehicle and sensor arrangement. A plot 68 of the tunnel sensor average acceleration indicates that the threshold 64 was passed at approximately 9 milliseconds.

Figures 6, 7, 8:
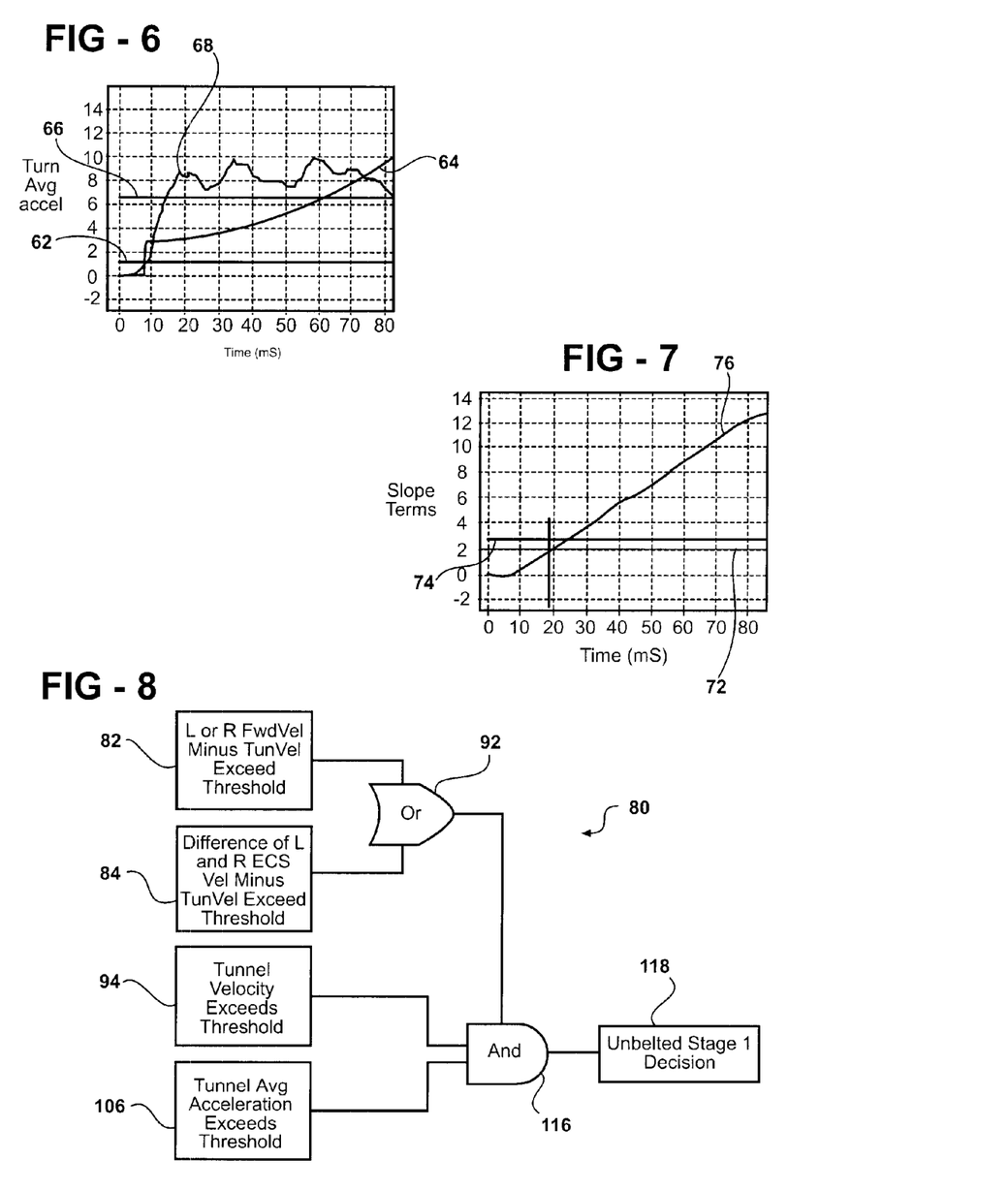
FIG. 6 is a graphical illustration of sensor information as used in one example implementation of this invention.
FIG. 7 is a graphical illustration of sensor information as used in one example implementation of this invention.
FIG. 8 is a logic flow diagram of a decision strategy for determining a second example type of impact condition in one example implementation of this invention.

The other determination made for detecting a frontal impact event and deciding whether to deploy the airbag in the illustrated example includes determining whether the tunnel sensor velocity exceeds a threshold at 70. FIG. 7 graphically illustrates such a determination where a base threshold 72 and a severe threshold 74 are utilized. The plot 76 of the tunnel sensor velocity exceeds the threshold 72 at approximately 19 milliseconds.

The determinations made at 42, 50, 70 and 60 in FIG. 3 are combined so that if all of the appropriate criteria are met and the determinations made at 42 and 50 satisfy the timing criteria of the decision process at 58, the controller 30 determines to deploy the airbag or other supplemental restraint device at 78.

Another type of impact event is an offset impact where only one side of the front of the vehicle is involved in the impact. FIG. 8 graphically illustrates the logical flow of an example decision process for detecting such an event and determining whether to activate or deploy the supplemental restraint device 22. The decision logic schematically shown in FIG. 8 is particularly useful when a driver of the vehicle is not wearing a seatbelt (i.e., an unbelted condition).

According to one example implementation of this invention, a frontal offset event is determined by looking for a significant enough difference between the left and right front sensor velocities. The tunnel sensor velocity is also used. Accordingly, if either the left or right front sensor velocity minus the tunnel sensor velocity exceeds the difference threshold or a determined difference between the front sensor velocities minus the tunnel sensor velocity exceeds the appropriate threshold, that portion of the decision process has been satisfied.

As can be appreciated in the logical diagram 80, discriminating an offset event when determining whether to deploy an airbag includes determining the relationship between the tunnel sensor velocity and the left front sensor velocity or the right front sensor velocity (but not both). The tunnel sensor velocity is also compared to a threshold and the tunnel average acceleration is compared to a threshold. Depending on the timing of when the thresholds are met determines whether the airbag will be deployed.

For vehicles that have separate left and right front sensors, either the left or right front sensor velocity is compared to the tunnel sensor velocity at 82. If the difference between either front sensor velocity and the tunnel sensor velocity exceeds the difference threshold, then the output from 82 is positive.

Alternatively, at 84, a difference between the left and right front sensor velocities is compared to the tunnel sensor velocity. The result of subtracting the tunnel sensor velocity from the difference of the right and left front sensor velocity is then compared to the difference threshold.

Figure 9:
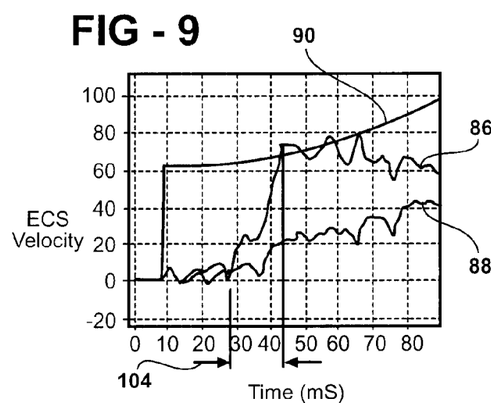
FIG. 9 is a graphical illustration of sensor information as used in one example implementation of this invention.

FIG. 9 graphically illustrates the difference between the left front sensor velocity and the tunnel sensor velocity at 86 and the difference between the right front sensor velocity and the tunnel sensor velocity at 88. The difference between the left front sensor velocity and the tunnel sensor velocity exceeds the threshold 90 at the time of approximately 44 milliseconds. Accordingly, a positive result from the OR gate 92 is provided at 44 milliseconds.

Figure 10:
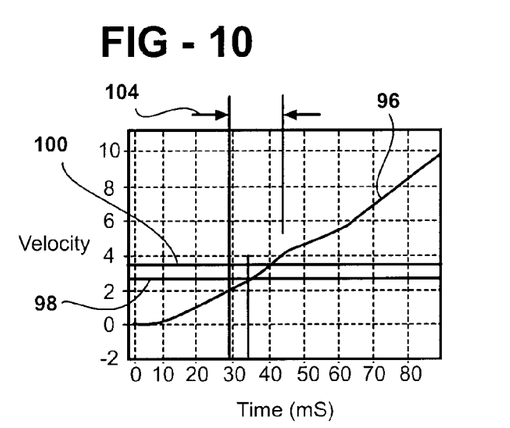
FIG. 10 is a graphical illustration of sensor information as used in one example implementation of this invention.

According to the illustrated example of FIG. 8 the tunnel sensor velocity is also compared to a threshold at 94. FIG. 10 graphically illustrates the tunnel sensor velocity at 96 along with a first threshold 98 and a more severe threshold 100. The first threshold 98 is exceeded at approximately 30 milliseconds. The 14 second difference between the times at which the tunnel sensor velocity threshold 98 was exceeded and the time when the difference threshold 90 was exceeded is shown at 104. Although not specifically shown in FIG. 8, the decision in this example includes determining whether the size of the window 104 is within acceptable time limits.

Figure 11:
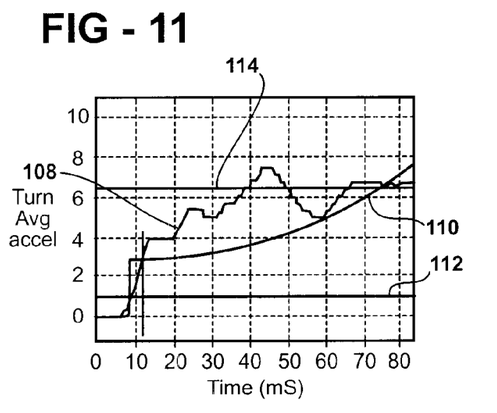
FIG. 11 is a graphical illustration of sensor information as used in one example implementation of this invention.

Additionally, the tunnel sensor average acceleration is compared to a threshold at 106. FIG. 11 graphically illustrates the tunnel sensor average acceleration at 108, which exceeds an average tunnel acceleration threshold 110 at approximately 12 milliseconds. The illustration of FIG. 11 also includes a selected tunnel sensor average acceleration minimum threshold at 112 and a severe threshold at 114. Because the tunnel average acceleration 108 exceeds the threshold 110 at the same time that the tunnel velocity 96 exceeds the threshold 98 and the difference between the left front sensor velocity and the tunnel sensor velocity shown at 86 exceeds the difference threshold 90, the output of the AND gate 116 is positive and the controller 30 determines to deploy the airbag at 118.

Figure 12:
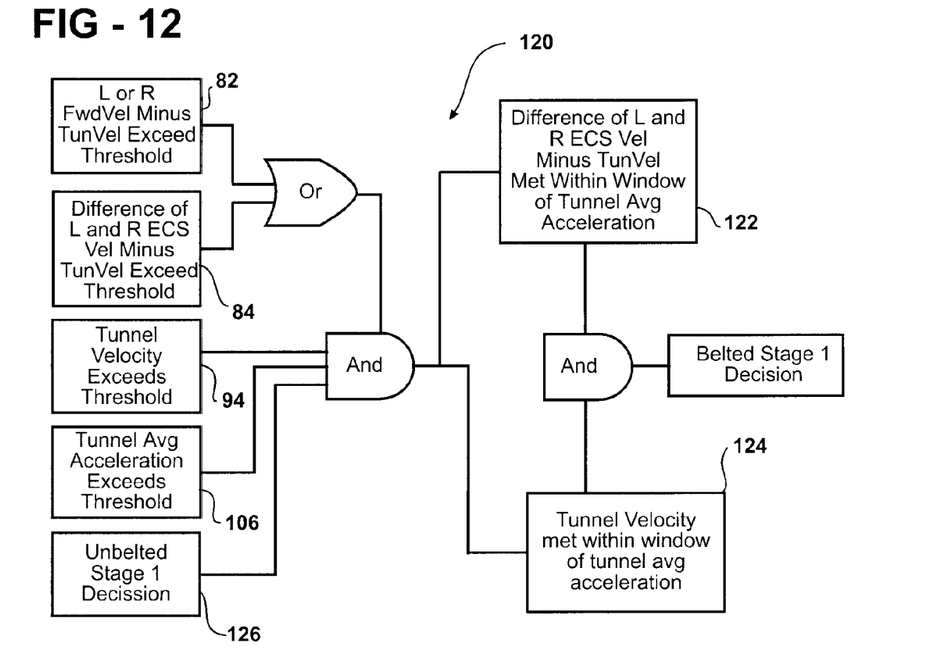
FIG. 12 is a logic flow diagram showing a decision strategy according to one example implementation of this invention useful with the impact condition of FIG. 8 under different circumstances.

FIG. 12 schematically illustrates a decision process 120 for an offset impact event when an individual is wearing their seatbelt (i.e., a belted condition). The primary difference between the decision process schematically illustrated at 120 and that illustrated at 80 (FIG. 8), is the inclusion of determining whether the difference of the left and right front sensor velocities minus the tunnel sensor velocity exceeds the appropriate threshold within a window dictated by the tunnel sensor average acceleration. This is schematically shown at 122 in FIG. 12. Additionally, a determination whether the tunnel sensor velocity threshold is met within the window of the tunnel sensor average acceleration is made at 124. A determination whether the belted condition is satisfied is made at 126 in FIG. 12. Otherwise, the decisions schematically illustrated in the diagram 120 are the same as those in the diagram 80.

The third type of impact event that can be discriminated in the example implementation of this invention is a bumper override impact event. Under such conditions, the frame rails 38 and bumper 36 typically are not involved in the impact as the point of contact with the vehicle is above the bumper 36 (hence, the name). Determining when a bumper override impact event occurs in one example includes looking for a lack of tunnel sensor slope when the difference between the front sensor velocity and the tunnel sensor velocity exceeds the difference threshold.

Figure 13:
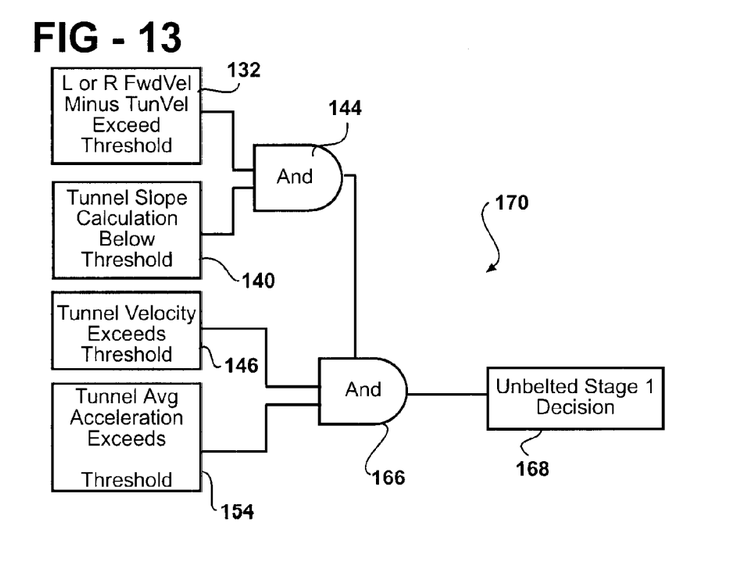
FIG. 13 is a logic flow diagram of a decision strategy useful with an example implementation of this invention for a third type of impact condition.

A logical flow diagram 130 is shown in FIG. 13 indicating an example decision process for controlling the air bag 22 in a bumper override impact event. Under these circumstances, according to the illustrated example, several factors and their timing are considered. The airbag 22 should be deployed when the difference between both of the front sensor velocities and the tunnel sensor velocity exceeds the difference threshold and the slope threshold is not met within a selected time window. Additionally, if the tunnel sensor velocity exceeds a corresponding threshold and the tunnel sensor average acceleration exceeds a corresponding threshold when the other criteria are met, airbag deployment is desired.

Figure 14:
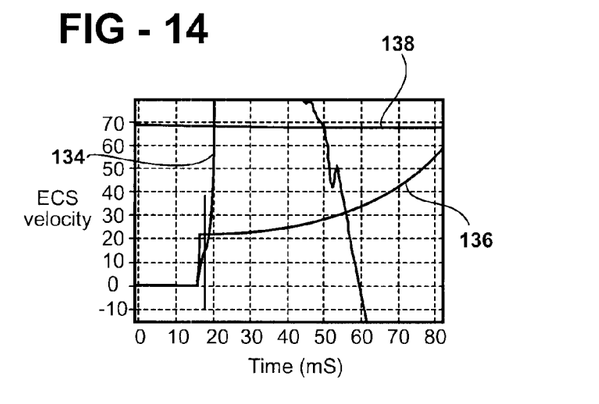
FIG. 14 is a graphical illustration of sensor information as used in one example implementation of this invention.

The left and right front sensor velocities are compared to the tunnel sensor velocity at 132. The difference between the left and right front sensor velocities and the tunnel sensor velocity are compared to a difference threshold. This is shown in FIG. 14 in graphical form where a plot 134 of the difference between the front sensor velocities and the tunnel sensor velocity exceeds the difference threshold 136 at a time of approximately 18 milliseconds. The difference 134 also exceeds a severe threshold 138 at approximately 20 milliseconds.

Figure 15:
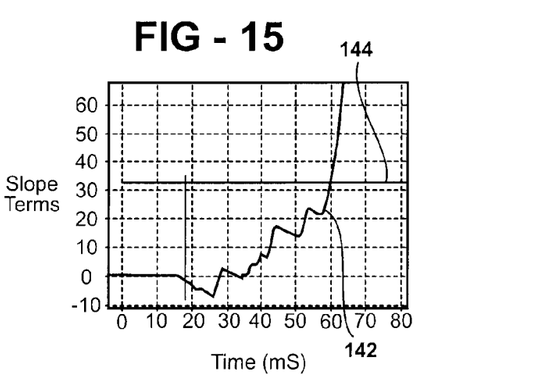
FIG. 15 is a graphical illustration of sensor information as used in one example implementation of this invention.

The decision process 130 includes determining whether the tunnel sensor slope is below a slope threshold at 140. This is graphically illustrated in FIG. 15 where the tunnel sensor slope 142 is below the slope threshold 144 at the 18 millisecond time. Accordingly, the output of the AND gate 144 would be positive.

Figure 17:
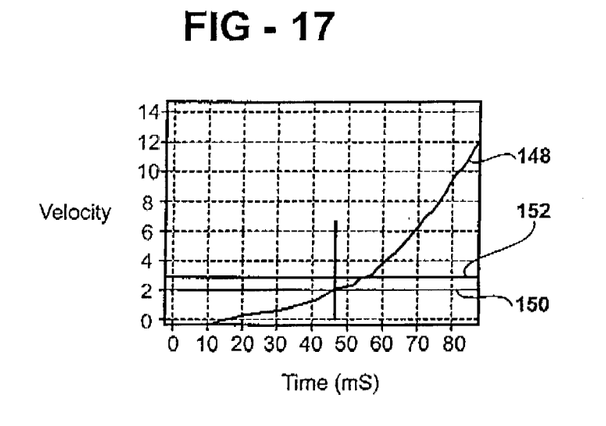
FIG. 17 is a graphical illustration of sensor information as used in one example implementation of this invention.

At 146, the tunnel sensor velocity is compared to a threshold. This is shown graphically in FIG. 17 where the tunnel sensor velocity plot 148 exceeds the threshold 150 at a time of 46 milliseconds. A severe tunnel velocity threshold 152 is also illustrated in FIG. 17.

Figure 16:
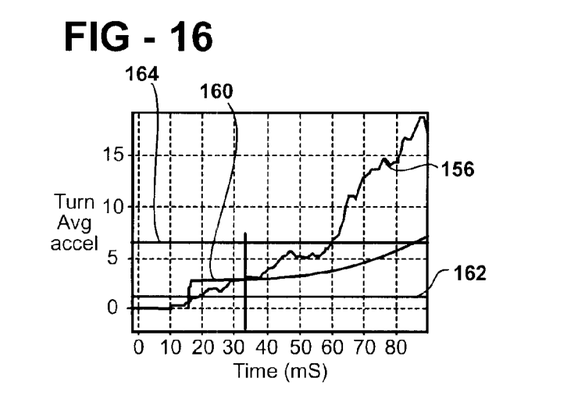
FIG. 16 is a graphical illustration of sensor information as used in one example implementation of this invention.

Another consideration 154 in the decision process 130 is whether the tunnel sensor average acceleration exceeds a threshold. Referring to FIG. 16, a plot 156 of the tunnel sensor average acceleration exceeds the threshold 160 at a time of 34 milliseconds. A minimum threshold 162 and a maximum threshold 164 are also shown in the plot of FIG. 16.

Depending on the outputs from the decisions made at 146 and 154 (in FIG. 13) and the output of the AND gate 144, the output of the AND gate 166 will provide the information for making the decision at 168 whether to deploy the supplemental restraint device 22.

Figure 18:
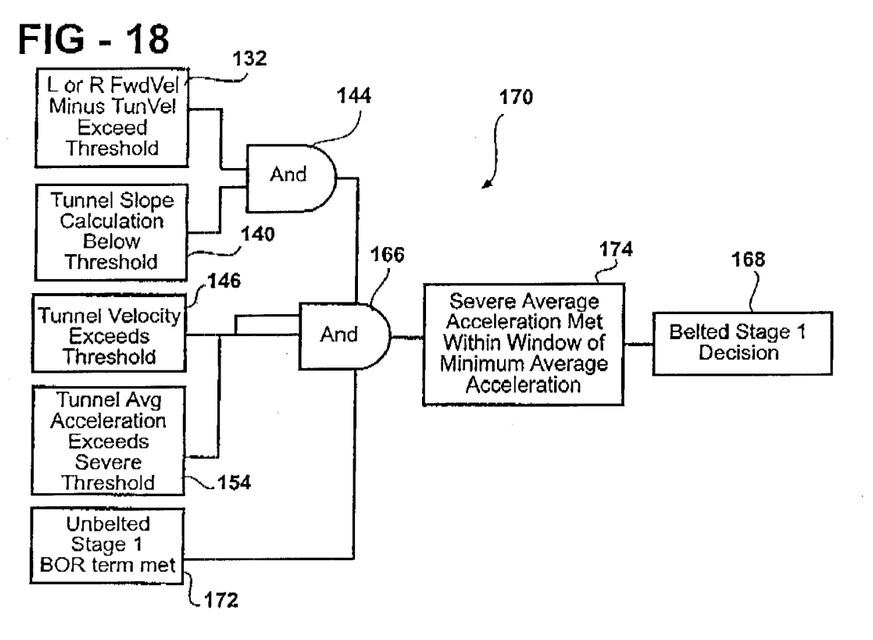
FIG. 18 is a logic flow diagram showing a decision strategy for an example implementation of this invention for an impact condition like that in FIG. 13 under different circumstances.

FIG. 18 shows a decision process 170 that is very similar to the decision process 130 with two additional features. 172 schematically illustrates an unbelted bumper override term that is checked against predetermined conditions for deciding whether the vehicle occupant is wearing a seatbelt. The output of this decision is provided to the AND gate 166 along with the output of the decisions made at 146 and 154, which were described above. The output of the AND gate 166 is then combined with a decision whether the severe threshold 164 (seen in FIG. 16) was exceeded within the window of minimum average acceleration. This part of the decision process is shown at 174. Depending on a result of that determination, the decision to deploy the supplemental restraint device is made at 168.

As can be appreciated, at least three different types of impact events can be discriminated utilizing the inventive approach to processing data available from at least one front sensor and a tunnel sensor. The example implementations of the inventive system are not the only uses of the inventive approach that provides the benefits available from this invention. These particular examples have been given but do not necessarily limit the scope of this invention.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. An impact detection system for use on a vehicle, comprising:
   at least one front sensor positioned near a front portion of the vehicle;
   at least one tunnel sensor positioned near a central location on the vehicle; and
   a controller that communicates with each of the front sensor and the tunnel sensor and determines an impact condition by determining whether a difference between a front sensor velocity and a tunnel sensor velocity exceeds a difference threshold.

2. The system of claim 1, wherein the controller determines whether the impact condition is one of a selected plurality of possible impacts.

3. The system of claim 2, wherein the controller determines whether the impact condition is a frontal impact, an offset impact or a bumper override impact.

4. The system of claim 1, wherein the controller uses a relationship between a slope term and the difference between the front sensor velocity and the tunnel sensor velocity to determine whether the impact condition is a frontal impact.

5. The system of claim 4, wherein the controller determines whether the slope term exceeds a slope threshold and determines whether the slope threshold and the difference threshold are both exceeded within a selected time.

6. The system of claim 5, wherein the controller determines whether the tunnel sensor velocity exceeds a tunnel sensor velocity threshold and whether a tunnel sensor acceleration value exceeds a tunnel sensor acceleration threshold when the difference threshold is exceeded, the slope threshold is exceeded and the tunnel sensor velocity threshold is exceeded.

7. The system of claim 1, including a left front sensor, and a right front sensor and wherein the controller determines that the impact condition is an offset impact using a relationship between either the left front sensor velocity or the right sensor velocity and the tunnel sensor velocity.

8. The system of claim 7, wherein the controller determines whether the tunnel sensor velocity exceeds a tunnel sensor velocity threshold and the difference threshold is exceeded within a selected period of time and determines whether a tunnel sensor acceleration value exceeds a corresponding threshold.

9. The system of claim 1, including at least two front sensors and wherein the controller determines whether the impact condition is a bumper override impact using a relationship between a determination whether a slope term has not exceeded a slope threshold and the difference between both of the front sensor velocities and the tunnel sensor velocity has exceeded the difference threshold.

10. The system of claim 9, wherein the controller determines whether a difference between both of the front sensor velocities and the tunnel sensor velocity exceed the difference threshold and the slope term has not exceeded the slope threshold within a selected time.

11. The system of claim 10, wherein the controller determines whether the tunnel sensor velocity exceeds a tunnel sensor velocity threshold and a tunnel sensor acceleration value exceeds a corresponding threshold when the difference threshold has been exceeded and the slope threshold has not been exceeded.

12. A method of detecting a vehicle impact condition using a system having at least one front sensor and a tunnel sensor, comprising the steps of:
   (a) determining a front sensor velocity;

(b) determining a tunnel sensor velocity;

(c) determining a difference between the front sensor velocity and the tunnel sensor velocity; and (d) determining whether the difference determined in step (c) exceeds a difference threshold.

13. The method of claim 12, including determining whether the impact condition is one of a frontal impact, an offset impact, or a bumper override impact using the determination of step (d).

14. The method of claim 12, including determining a slope term;
   determining whether the slope term exceeds a slope threshold; and
   determining whether the slope threshold and the difference threshold are both exceeded within a selected time.

15. The method of claim 14, including determining whether the tunnel sensor velocity exceeds a tunnel sensor velocity threshold;
   determining a tunnel sensor acceleration value;
   determining whether the tunnel sensor acceleration value exceeds a tunnel sensor acceleration threshold; and
   determining whether each of the difference threshold, the slope threshold and the tunnel velocity threshold is exceeded within a selected amount of time.

16. The method of claim 12, wherein the system includes a left front sensor, and a right front sensor and the method includes determining that the impact condition is an offset impact using a relationship between either the left front sensor velocity or the right sensor velocity and the tunnel sensor velocity.

17. The method of claim 16, including determining whether the tunnel sensor velocity exceeds a tunnel sensor velocity threshold;
   determining whether the difference between the left front sensor and the right front sensor velocity and the tunnel sensor velocity exceeds the difference threshold within a selected period of time; and
   determining whether a tunnel sensor acceleration value exceeds a corresponding threshold.

18. The method of claim 12, wherein the system includes at least two front sensors and the method includes determining whether the impact condition is a bumper override impact using a relationship between a determination whether a slope term has not exceeded a slope threshold and the difference between both of the front sensor velocities and the tunnel sensor velocity has exceeded the difference threshold.

19. The method of claim 18, including determining whether a difference between each of the front sensor velocities and the tunnel sensor velocity exceeds the difference threshold and determining whether the slope term has not exceeded the slope threshold within a selected time.

20. The method of claim 19, including determining whether the tunnel sensor velocity exceeds a tunnel sensor velocity threshold and determining whether a tunnel sensor acceleration value exceeds a corresponding threshold when the difference threshold has been exceeded and the slope threshold has not been exceeded.

21. The system of claim 1, wherein the controller determines a direction associated with the impact condition.

22. The method of claim 12 including determining a direction of impact associated with the impact condition.

23. An impact detection system for use on a vehicle, comprising:
   at least one front sensor positioned near a front portion of the vehicle;
   at least one tunnel sensor positioned near a central location on the vehicle; and
   a controller that communicates with the front sensor and the tunnel sensor and determines whether a difference between a front sensor velocity and a tunnel sensor velocity exceeds a difference threshold, the controller determining whether an impact condition is at least one of a frontal impact, an offset impact or a bumper override impact based upon the determined relationship between the determined difference and the difference threshold.

* * * * *